United States Patent Office 3,222,381
Patented Dec. 7, 1965

3,222,381
STABILIZATION OF EPOXY COMPOUNDS
John G. Iacoviello and Rudolph Rosenthal, Broomall, Pa., assignors to Allied Chemical Corporation, New York, N.Y., a corporation of New York
No Drawing. Filed Aug. 2, 1961, Ser. No. 128,659
10 Claims. (Cl. 260—348)

This invention relates to the purification of epoxidized ethylenically unsaturated compounds, and more particularly to the stabilization against discoloration, of such compounds as have been prepared by epoxidation with a peracid of a cyclic anhydride such as phthalic anhydride, formed in situ in the presence of hydrogen peroxide in the absence of any added catalyst.

In co-pending application of Max B. Mueller, John G. Iacoviello and Rudolph Rosenthal, Serial No. 37,852, now Patent Number 2,155,638, filed June 22, 1960, there is disclosed a process for epoxidizing ethylenically unsaturated compounds, especially the non-conjugated unsaturated drying oils such as soybean oil, etc., which comprises reacting the unsaturated compound with a concentrated solution of hydrogen peroxide and a cyclic anhydride such as phthalic anhydride at temperatures between 20° C. and about 100° C. until the desired degree of epoxidation has been accomplished.

The above process has numerous advantages over prior art processes wherein aliphatic peracids are employed for epoxidation in the presence of a strong mineral acid such as sulfuric acid. These advantages include the facts that (1) the process of the co-pending application requires no acid catalyst, (2) the dicarboxylic acids formed in the reaction, e.g. phthalic acid, have little or no tendency to react further with the oxirane ring once it is formed, and (3) these dicarboxylic acids, being solids, are readily removed from the reaction medium as by simple filtration. The process of the co-pending application, moreover, permits preparation of epoxidized products with essentially the theoretical equivalent amount of oxirane oxygen, equivalent to all or any desired part of the double bonds in the starting material.

It has been found, however, that the cyclic anhydride-hydrogen peroxide epoxidation process of the co-pending application gives rise to the development of a unidentified acidic substance which turns red when treated with alkaline materials, and which turns brown on heating. This color-producing material, remaining in the epoxidized product, causes the product to discolor when subjected to heat. Such products fail to meet the color heat stability requirements commonly set up in the trade for various end uses, which in general require a Gardner-Holdt reading of not more than 4. This troublesome material is not removed by the conventional neutralization and purification procedures previously practiced in the recovery of epoxidized products, and which are employed satisfactorily in the purification of epoxidized products prepared by other methods, for example, by the in situ epoxidation with peracetic acid. Thus, aqueous caustic treatment, with or without water washing of the product, is ineffective to remove the color-producing impurities formed in the process of the co-pending application nor is the more recently developed procedure involving treatment of the epoxidized product with solid particulate caustic material in the absence of water, effective in removing the troublesome color-forming impurities produced in the cyclic anhydride epoxidation process.

It is an object of the present invention to provide a method for stabilizing epoxidized ethylenically unsaturated compounds against color degradation.

A further object of the invention is to provide a method for removing acidic color-forming impurities from epoxidized ethylenically unsaturated compounds which have been prepared by the cyclic anhydride-hydrogen peroxide technique of the above referred to co-pending application.

Other objects will appear hereinafter.

The above and other objects are accomplished according to our invention wherein an epoxidized ethylenically unsaturated compound is treated at elevated temperatures with a homogeneous solution of an alkali metal hydroxide dissolved in approximately equal parts by weight of water and a lower aliphatic alcohol.

The process of our invention is effective not only in removing the unusual acidic color-forming impurities produced in the cyclic anhydride epoxidation process of the above co-pending application, but the same treatment, applied to epoxidized products such as sulfuric acid catalyzed, in situ peracetic acid epoxidized drying oils and other epoxy plasticizers prepared by other processes and containing different types of acidic color-forming impurities, is effective in stabilizing such other epoxidized products against color degradation. Thus, our stabilization process is one of general application and thus offers the advantage of a standardized process for stabilizing epoxy compounds containing acidic color-forming impurities regardless of their method of preparation. As brought out above, however, it is especially useful in stabilizing epoxidized compounds prepared by the cyclic anhydride-hydrogen peroxide epoxidation process of the above co-pending application.

The above co-pending application employs as epoxidizing agent, hydrogen peroxide in conjunction with certain cyclic anhydrides of dicarboxylic acids, i.e., cyclic anhydrides of aromatic or saturated aliphatic dicarboxylic acids wherein the oxygen-containing ring is a five-membered ring containing four carbon atoms and one oxygen atom. Thus, the suitable cyclic anhydrides include those having the structural formula

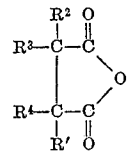

wherein R′, R², R³ and R⁴ are members selected from the group consisting of hydrogen, lower alkyl and aralkyl groups, and

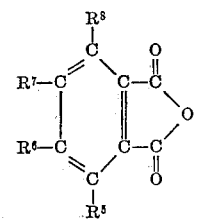

and

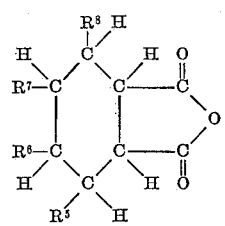

(1,2-cyclohexane carboxylic acid anhydride derivatives)

wherein R⁵, R⁶ R⁷ and R⁸ are members selected from the group consisting of hydrogen and lower alkyl.

The preferred anhydrides are phthalic anhydride and succinic anhydride.

Compounds which lend themselves to epoxidation by the hydrogen peroxide-cyclic anhydride process of the above co-pending application include ethylenic compounds in which the ethylenic carbons each have at least one hydrogen substituent and at least one of the ethylenic carbons is substituted by an organic radical such as compounds of the formulas

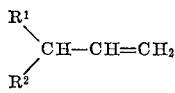

and

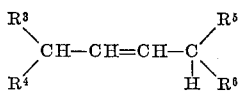

wherein the R substituents are organic radicals or hydrogen. Especially preferred are those wherein $R^1$ and $R^2$ are members selected from the group consisting of hydrogen, alkyl, alkenyl, acyloxy, aroyloxy radicals, and alkenyl ester substituted aroyloxy and acyloxy radicals, wherein $R^3$ and $R^5$ are hydrogen or alkyl radicals and wherein $R^4$ and $R^6$ individually are selected from the group consisting of hydrogen, alkyl, alkenyl, alkyl- and alkenyl-carboxylic acid radicals, alkyl- and alkenyl-carboxylic ester groups, and wherein $R^4$ and $R^6$ taken jointly are selected from alkylene groups and alkyl- and alkenyl carboxylic acid or ester substituted alkylene groups. Among such compounds included in the above formulas are the higher unsaturated fatty hydrocarbons, fatty acids and esters, particularly those present in the naturally occurring unsaturated oils such as linseed oil, perilla oil, safflower oil, soyabean oil, etc., i.e., mixed glycerides of saturated and unsaturated acids, the latter including oleic, linoleic, linolenic, etc. acids; also included are allyl esters of organic acids such as diallyl phthalate, diallyl maleate, diallyl fumarate, diallyl adipate, etc.; cycloalkenes and their derivatives, such as cyclopentene, dicyclopentadiene, cyclohexene, aliphatic esters of $\Delta^4$-tetrahydrophthalic acid and the like. Esters of $\Delta^1$-tetrahydrophthalic acid have the ethylenic double bond conjugated with respect to other unsaturation, i.e., the carbonyl group, and hence are inoperative as is also styrene, in which the ethylenic double bond is conjugated with an aromatic ring double bond.

In addition to the chemical compounds and natural oils mentioned above, the epoxidation process of the co-pending application can be applied to more complex products having one or more, or a plurality of ethylenic double bonds of the type indicated. Thus, polymeric materials having double bonds can be modified by our epoxidation process, for example, the diallyl phthalate prepolymer known as the beta polymer, may be partially epoxidized leaving a portion of the allyl groups unreacted and available for curing or for cross linking as with phthalic anhydride or glycols to further modify the properties of the polymeric material as desired.

In the discussion which follows the present process will be described primarily as it relates to the use of phthalic anhydride and to the drying oils, especially soyabean oil as illustrative but it is to be understood that the procedure is one of wide application to epoxidized products generally which contain acidic impurities which tend to form objectionable color upon heating.

In carrying out the process according to our invention, the epoxidized compound is preferably treated during the course of the recovery procedure after completion of the epoxidation reaction. Thus, the epoxidation mixture, usually containing a liquid hydrocarbon such as benzene, toluene, xylene, heptane, etc., as reaction medium, is first treated to remove the major portion of acidic material. In the case of cyclic anhydride epoxidized products, the bulk of the acid formed in the reaction is the corresponding acid, e.g. phthalic acid, which, being a solid at normal temperatures may be removed mechanically as by filtration. The epoxidized product is then water washed, preferably with relatively large volumes of water to reduce its acidic content further. Then, according to our invention the epoxidized product is contacted with a solution of an alkali metal hydroxide such as sodium or potassium hydroxide, dissolved in approximately equal parts by weight of water and a lower aliphatic alcohol such as methanol. The contacting is continued, preferably with agitation and at elevated temperatures, for a sufficient time to cause at least the major portion of the troublesome color-forming impurities to dissolve in the caustic-aqueous alcohol solution. The mixture is then separated into two liquid phases. For example, it may be allowed to stand without agitation until it forms two layers. The lower, caustic-aqueous alcohol layer, containing the color-forming impurities, usually a deep red at this stage, is then separated by decantation. The upper, epoxidized produce layer may be further washed with water until neutral, to remove residual caustic and alcohol. The hydrocarbon reaction medium may then be stripped to recover finished epoxidized product.

Time and temperature of treatment will be sufficient to effect good contact between epoxy product and caustic aqueous alcohol solution, and to extract the desired portion of the color-forming impurities. Temperatures between about 20° C. and about 100° C. for periods of contact between about one-half hour and about two hours are satisfactory. Refluxing with total return is a convenient method of attaining such temperatures.

Caustic concentration and quantity of the aqueous alcohol extracting solution should provide an excess of alkali over that theoretically required to neutralize the acidity of the epoxidized product, preferably between about 3 times and about 5 times the theoretical requirement. Theoretical caustic requirement may be determined preferably just prior to aqueous alcohol-caustic treatment by conventional alcoholic KOH titration of a sample of the crude product mixture.

Proportions of alcohol and water in which the caustic is dissolved should preferably be approximately equal parts by weight for satisfactory removal of color-forming bodies, for example, between about 40 parts alcohol to 60 parts water and 60 parts alcohol to 40 parts water.

Suitable alcohols are the lower aliphatic mono- and polyhydric alcohols which form homogeneous solutions of up to about 15% concentration of sodium hydroxide, in mixtures of the alcohol with between about 40% and about 60% of water, including methanol, ethanol, ethylene glycol, diethylene glycol, propylene glycol, dipropylene glycol, glycerol, etc.

The reason for the effectiveness of our process, in removing the troublesome acidic color-forming impurities as described, is not clearly understood. However, it appears probable that the sodium salts of such impurities, which presumably are formed, are soluble in the aqueous-alcohol caustic solution (but not in aqueous alkali alone, nor in alcoholic caustic), and are thus withdrawn from the product into the solution and are readily removable when the extracting solution is allowed to layer.

Epoxidized ethylenically unsaturated compounds treated according to our invention can be stabilized against color degradation on heating to such extent that they meet the conventional requirements for this property, usually a Gardner-Holdt color of not more than 4. Color readings of 2 or less may readily be obtained according to our invention. A reading of 1+, 2+, etc. indicates a color between the value stated and the next higher value, and is nearer to the value stated than to the higher value.

The following specific examples further illustrate our invention. Parts are by weight except as otherwise noted.

Example 1

To a stirred mixture of 400 parts crude soybean oil (iodine number 131), 388 parts phthalic anhydride, and 400 parts xylene heated to 60° C. was added 147 parts 50 percent hydrogen peroxide over a one hour period maintaining the temperature at 60° C. by intermittent cooling. After two hours the temperature dropped to 45° C. and titration for hydrogen peroxide indicated that 3.9 percent of the original hydrogen peroxide remained. The mixture was filtered and washed with 600 parts xylene. The wet cake amounted to 543 parts. The oily filtrate, amounting to 1338 parts, was washed three times with 3,000 part portions of deionized water at 60–70° C. A solution of 4 parts NaOH, 12 parts water, and 12 parts methanol was added and the mixture was heated with stirring at 70° C. for two hours. After settling, 50 parts of caustic layer was removed and the oil layer washed four times with 3,000 part portions of 60–70° C. deionized water. The washed product was stripped at 150° C. and 1–2 mm. for one-half hour giving 401 parts of product having an oxirane content of 6.9 percent and an iodine number of 2.3. After heating at 176° C. for two hours the material had a color of 2+ on the Gardner-Holdt scale. According to current specifications the color should not exceed 4.

When the above example was carried out in a manner identical to that described except that the oily filtrate after washing with water was treated with a 5% aqueous solution of sodium bicarbonate instead of the aqueous-alcohol sodium hydroxide solution, the Gardner-Holdt color stability of the product was 10+. When aqueous sodium hydroxide of 1% concentration was used in place of the aqueous alcohol caustic solution, a product with a Gardner-Holdt color stability of 6+ resulted. A calcium hydroxide treatment gave a product with a color stability of 6. A flake caustic treatment of the water-washed filtrate resulted in a product having color stability of 6+.

Example 2

To a 16-gallon stainless steel reaction vessel equipped with an anchor stirrer (speed 47 r.p.m), cooling jacket, thermowell, reflux condenser, and a polyethylene dropping funnel were added 30 pounds soybean oil, 30 pounds xylene, and 29.1 pounds phthalic anhydride. The contents were heated to 40° C. by using a steam mixing valve connected to the water supply to the jacket. 50 percent $H_2O_2$ (11.69 pounds) was added dropwise over a two hour period maintaining the temperature at 40° C. by cooling with 30° C. water. After 7.5 hours the hydrogen peroxide content dropped to 3.9 percent of that originally added and the reaction mass was then cooled to 20° C. and filtered in a large earthenware crock. The kettle was rinsed with 45 pounds xylene which was then used to wash the phthalic acid cake. The filtrate was drawn from the crock into a 25 gallon stainless steel drum under a vacuum of 40 mm. Hg and weighed 89 pounds. The wet phthalic acid cake weighed 56.94 pounds. The filtrate was transferred back to the stainless steel reaction vessel and washed four times with four-gallon portions of 60° C. deionized water (16 gallons total). The washing cycle was 15 minutes for each wash and 30 minutes for settling and separation. A 14.3 percent solution of sodium hydroxide in equal amounts of water and methanol, 953 grams, was added, and the mixture heated with stirring at 70° C. for two hours. After settling for one hour, 1636 grams of caustic layer was removed and the oil washed four times with four-gallon portions of 60° C. deionized water (16 gallons total) allowing 30 minutes each time for settling and separation. A portion of the oil was transferred to a six-gallon stainless steel pot equipped with high pressure steam coils and a condenser, and heated to a pot temperature of 100–125° C. at 40–50 mm. The remaining oil was fed into the pot at a rate equal to that at which the xylene was being stripped off. The product was then heated to 150–160° C. at 1–2 mm. for one hour before filtering. Twenty nine pounds of epoxidized soybean oil having an oxirane content of 6.85 percent and an iodine number of 1.3 was obtained. After heating at 176° C. for two hours the material had a color of 1+ on the Gardner-Holdt scale.

Example 3

To a stirred mixture of 193 parts of soybean oil having an iodine number of 130, 193 parts of benzene and 200 parts of 1,2-cyclohexane-dicarboxylic acid anhydride, heated to 40° C., was added dropwise over a 1.5 hour period, 72 parts of a 50 percent aqueous solution of hydrogen peroxide, while maintaining the temperature at 40° C. After an additional 4.5 hours at 40° C., 16.7 percent of the original hydrogen peroxide remained. The mixture was filtered, and the filtrate was washed first with water, then heated with stirring at 70° for two hours with 21 parts of a 14.3% solution of sodium hydroxide in equal amounts of water and methanol. After settling for one hour, the caustic layer was removed and the oil washed with water. The benzene was removed under reduced pressure. The resulting epoxidized soybean oil product had an iodine number of 27, an oxirane oxygen content of 5.8 percent and a Gardner-Holdt color after heating for 2 hours at 176° C. of 2+.

Example 4

To a stirred mixture of 50 parts of soybean oil having an iodine number of 130, 50 parts of benzene and 72 parts of $\alpha,\alpha$-dimethylbenzyl succinic anhydride, heated to 40° C., was added dropwise over a 0.5 hour period, 19 parts of a 50 percent aqueous solution of hydrogen peroxide, while maintaining the temperature at 40° C. After 1.5 hours the temperature was raised to 48° C. for 1.0 hour and then to 55° C. for 2.0 hours at which time 8.12 percent of the original hydrogen peroxide remained. The cooled mixture was filtered and the filtrate was washed first with water, then heated with stirring at 70° for ¾ hour with 21 parts of a 14.3% solution of sodium hydroxide in equal amounts of water and methanol. After settling for one hour, the caustic layer was removed and the oil washed with water. After removal of the benzene under vacuum the epoxidized soybean oil product had an oxirane oxygen content of 6.26 percent, an iodine number of 1.4, and a Gardner-Holdt color stability of 2+.

Example 5

A mixture of 320 parts 50% hydrogen peroxide, 142 parts acetic acid and 19 parts 49% sulfuric acid were mixed and allowed to stand overnight. This mixture was then added slowly to 800 parts soybean oil maintaining the temperature at 53–57° C. for approximately 12 hours and was then allowed to stand overnight at room temperature. The aqueous layer was then removed and the oil layer divided into two equal parts. To one part was added 935 parts benzene and to the other 935 parts heptane. Each solution was then washed with three 1500 part portions of 60° C. deionized water. To each solution was added 28 parts of a 14.3% NaOH solution in equal parts of water and methanol and the mixture heated at 70° C. for two hours. From the benzene solution 51 parts of caustic layer was removed and from the heptane solution 56 parts. After washing the solutions 5 times with 1,000-part portions of 60° C. deionized water the solvents were removed under vacuum and heated to 150° C. at 1–2 mm. for 45 minutes. The product obtained from the benzene solution amounted to 401 parts and analyzed 5.7% oxirane oxygen and had an iodine number of 4.0. The product obtained from the heptane solution amounted to 407 parts and analyzed 6.0% oxirane oxygen and had an iodine number of 2.5. Both products had a color of 2+ on the Gardner-Holdt scale after heating at 176° C. for 2 hours.

Example 6

1200 grams soyabean oil, 1200 grams benzene and 1164 grams of phthalic were mixed and to the mixture was added 480 grams of 50% hydrogen peroxide over a two to three-hour period, keeping the temperature at 40° C. After a total reaction time of 9¾ hours, 7.13% of the original $H_2O_2$ remained unreacted. The mixture was then cooled to 16° C., filtered and washed with 1800 grams of benzene. The filtrate was washed 4 times with 4-liter portions of water at 60° C. To the washed filtrate was added 84 grams of a solution containing 12 grams NaOH, 43 grams $H_2O$ and 29 grams of ethanol. The mixture was refluxed 1¾ hours at 70° C. and allowed to settle for 1 hour. 168 grams of caustic layer was removed and the oil was washed five times with 4-liter portions of 55° C. water and stripped in the presence of active carbon at 150° C. at 2 mm. Hg. The product was filtered, giving 1210 grams of epoxidized soyabean oil which analyzed 6.9% oxirane, and had a heat stability of 2+ on the Gardner-Holdt scale.

While the above describes the preferred embodiments of the invention, it will be understood that departures may be made therefrom within the scope of the specification and claims.

We claim.

1. The method of stabilizing an epoxy organic compound containing color-forming acidic impurities arising in the epoxidation process, against color degradation on heating, which comprises contacting said compound at temperatures between about 20° C. and about 100° C. with a solution of an alkali metal hydroxide dissolved in a homogeneous mixture of water and a lower aliphatic alcohol containing water and alcohol in proportions between about 40 and about 60 percent by weight of water, the balance being alcohol, and containing an amount of alkali metal hydroxide in excess of that theoretically required to neutralize all the acidity in the said epoxy compound, until a substantial proportion of color-forming impurities has been removed.

2. The method according to claim 1 wherein the epoxy organic compound has been prepared by uncatalyzed hydrogen peroxide-cyclic anhydride epoxidation wherein the cyclic anhydride is an anhydride of the group consisting of anhydrides of aromatic and saturated aliphatic dicarboxylic acids wherein the oxygen-containing ring is a five membered ring containing 4 carbon atoms and 1 oxygen atom of an ethylenically unsaturated compound having a formula selected from the group consisting of

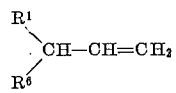

and

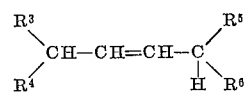

wherein $R^1$ and $R^2$ are members selected from the group consisting of hydrogen, alkyl, alkenyl, acyloxy and aroyloxy radicals, and alkenyl ester substituted aroyloxy and acyloxy radicals; $R^3$ and $R^5$ are selected from the group consisting of hydrogen and alkyl radicals; $R^4$ and $R^6$ taken individually are members selected from the group consisting of hydrogen, alkyl, alkenyl, alkyl- and alkenyl-carboxylic acid radicals, alkyl- and alkenyl-carboxylic ester radicals, and wherein $R^4$ and $R^6$ taken jointly are members selected from the group consisting of alkylene groups and alkyl- and alkenyl-carboxylic acid and substituted alkylene groups and alkyl- and alkenyl-carboxylic ester-substituted alkylene groups.

3. The method according to claim 2 wherein the aliphatic alcohol is methanol.

4. The process of stabilizing an epoxidized drying oil containing color-forming acidic impurities arising in the epoxidation process against color degradation on heating which comprises: contacting a fluid solution of said compound in a hydrocarbon solvent at a temperature between about 20° C. and 100° C. with a solution of an alkali metal hydroxide in a 40–60% by weight aqueous lower aliphatic alcohol solution in sufficient amount to provide alkali metal hydroxide in excess of that theoretically required to neutralize the acidity in said epoxy compound until a substantial proportion of color-forming impurities has been removed and separating from said fluid solution the solution of alkali metal hydroxide.

5. The process of claim 4 wherein said hydrocarbon solvent comprises an aromatic hydrocarbon.

6. The process of claim 4 wherein the aromatic hydrocarbon solvent comprises xylene.

7. The method of stabilizing an epoxidized drying oil containing color-forming acidic impurities, and having been prepared by reacting a drying oil containing non-conjugated double bonds with a concentrated solution of hydrogen peroxide and phthalic anhydride at temperatures between about 20° C. and about 100° C., which comprises contacting said epoxidized drying oil at temperatures between about 20° C. and about 100° C. with a solution of an alkali metal hydroxide in a mixture of approximately equal parts by weight of water and a lower aliphatic alcohol, said solution containing an excess of alkali metal hydroxide over that theoretically required to neutralize all the acidity in the said epoxidized drying oil.

8. The method according to claim 4 wherein the epoxidized drying oil is epoxidized soyabean oil.

9. The method of stabilizing against color degradation on heating, an epoxidized drying oil containing color-producing acidic impurities, said epoxidized oil having been prepared by reacting a mixture of phthalic anhydride and drying oil containing non-conjugated double bonds with a concentrated solution of hydrogen peroxide at temperatures between about 20° C. and about 100° C., which comprises first washing the epoxidized drying oil with water to reduce the acidity of the oil, then contacting said epoxidized drying oil with agitation at temperatures between about 20° C. and about 100° C. with an approximately 14% solution of an alkali metal hydroxide in a mixture of approximately equal parts by weight of water and methanol, said solution containing an excess of alkali metal hydroxide over that theoretically required to neutralize all the acidity in the said epoxidized drying oil, discontinuing agitation, separating the resulting aqueous alcohol-alkali metal hydroxide-containing layer from the epoxidized oil and washing the epoxidized oil with water to remove remaining alkali metal hydroxide.

10. The process according to claim 9 wherein the epoxidized drying oil is epoxidized soyabean oil.

References Cited by the Examiner
UNITED STATES PATENTS

| | | | |
|---|---|---|---|
| 2,595,735 | 5/1952 | Treves | 260—348.5 |
| 2,813,896 | 11/1957 | Krimm | 260—348.5 |
| 2,903,465 | 9/1959 | Suter et al. | 260—348.5 |

JOSEPH L. SCHOFER, *Primary Examiner.*

M. LIEBMAN, *Examiner.*